United States Patent [19]

Musy

[11] 4,418,735

[45] Dec. 6, 1983

[54] TIRE, PARTICULARLY FOR AIRPLANES, HAVING A CROWN REINFORCEMENT WITH EXTENSIBLE EDGES AND METHOD OF MANUFACTURING SAME

[75] Inventor: Jacques Musy, Clermont-Ferrand, France

[73] Assignee: Compagnie Generale des Etablissements Michelin, Clermont-Ferrand, France

[21] Appl. No.: 346,128

[22] Filed: Feb. 5, 1982

[30] Foreign Application Priority Data

Feb. 12, 1981 [FR] France ............................ 81 02788
Dec. 23, 1981 [FR] France ............................ 81 24263

[51] Int. Cl.³ .............................................. B60C 9/00
[52] U.S. Cl. ................................... 152/200; 152/198; 152/353 C; 152/356 R; 152/359; 152/361 DM; 152/362 R; 156/123; 156/124; 244/103 R; 264/258; 264/326

[58] Field of Search ............ 152/352 R, 353 R, 353 C, 152/354 R, 359, 354 RB, 356 R, 356 A, 357 R, 361 DM, 361 R, 362, 193, 198, 200; 244/103 R; 57/243, 244, 902; 428/105, 114, 295, 902; 156/110 R, 110 C, 123 R, 124; 264/315, 326, 258

[56] References Cited

U.S. PATENT DOCUMENTS

| | | | |
|---|---|---|---|
| 3,559,714 | 2/1971 | Verdier | 152/361 DM |
| 3,831,656 | 8/1974 | Senger | 152/361 DM X |
| 4,076,066 | 2/1978 | Verdier | 152/353 R |
| 4,258,773 | 3/1981 | de Saint-Michel | 152/352 R |
| 4,258,775 | 3/1981 | Samoto | 152/361 R |

Primary Examiner—William A. Powell
Assistant Examiner—Thomas Bokan
Attorney, Agent, or Firm—Brumbaugh, Graves, Donohue & Raymond

[57] ABSTRACT

The tripartite crown reinforcement of this tire is subdivided into a median portion composed of two plies of cables whose extensibility is practically zero, flanked by two lateral portions each composed of three plies of cables whose extensibility is very great. When this tire is not inflated, the edges of its tread resume the falling shape which has been imparted to them in the vulcanization mold.

18 Claims, 4 Drawing Figures

TIRE, PARTICULARLY FOR AIRPLANES, HAVING A CROWN REINFORCEMENT WITH EXTENSIBLE EDGES AND METHOD OF MANUFACTURING SAME

The present invention relates to tires, particularly for airplanes, whose reinforcement is formed, on the one hand, by a carcass reinforcement formed of at least one ply of radial cables which is anchored to at least one bead ring in each bead and, on the other hand, by a crown reinforcement formed of cables of textile materials which is arranged radially outwards of the carcass reinforcement. The invention relates in particular to means and methods of manufacturing such tires.

The standards relating, for instance, to airplane tires establish, for a tire corresponding to given dimensions, inflation pressure and static load, the maximum axial width and the radial height on the rim or, stated differently, the dimensions of the sides of the rectangle within which the meridian profile of this tire must be inscribed. In general, it would appear that in order to minimize heating in the crown as well as wear in particular of the edges of the tread of a tire, it is advisable to impart to this tire a meridian profile which comes as close as possible to the limits of a rectangular contour, such as referred to above.

For this purpose the tire can, for instance, be vulcanized in a mold which imparts not only to the outer contour but also to the reinforcement, as a result of the pressure of the vulcanization chamber or bag, a meridian curvature which, from a maximum very high value at the level of the shoulders, decreases rapidly in the direction both towards the equatorial plane and towards the sidewalls of the tire.

However, at high speeds, stationary waves rapidly occur on such a tire and the tire is of short life.

This drawback appears to be caused by the absence of tensions in the marginal regions of the crown reinforcement of textile fibers and even more by the absence of sufficient tension under the effect of the inflation pressure. As a matter of fact, under the influence of the inflation pressure the reinforcement does not retain a meridian profile identical to the one which it has in the vulcanization mold. The maximum curvature at the level of the shoulders tends to decrease in favor of increases in the equatorial diameter and in the maximum axial width of the reinforcement of the tire. This results in insufficient tension or even compression in the marginal zones of the crown reinforcement.

Therefore, the object of the present invention is both to maintain a quasi-rectangular meridian profile of the tire and its reinforcement and to obtain a delay in, or even elimination of, the formation of stationary waves on the tire, this twofold purpose being reached without recourse to additional reinforcement plies.

In accordance with French Pat. No. 2,141,557, two additional crossed plies of elastic cables forming angles of at most 30° with the cables of the carcass reinforcement are arranged radially inward of the carcass reinforcement in the region of the shoulders. However, this is a tire, on the one hand, for every heavy earth-moving equipment which, on the other hand, has a crown reinforcement of metal cables which are therefore resistant to circumferential contraction in the marginal zones.

For the purposes of the invention there qualifies as a tire of quasi-rectangular meridian profile after mounting on its service rim and inflation to its service pressure, any tire whose carcass reinforcement has a relative camber of convexity in the crown of at most 0.12, and preferably between 0.04 and 0.10, and a relative camber of convexity in the sidewalls of at most 0.14.

By convention, for the purposes of this invention the relative camber of convexity in the crown is defined on a meridian section of a tire (See FIG. 1). One considers the circular arc C which passes, on the one hand, through the equatorial point S at which the carcass reinforcement 2 intersects the trace ZZ' of the equatorial plane of the tire and, on the other hand, through the two points of intersection A and A' of the carcass reinforcement with the traces E and E' of planes parallel to the equatorial plane, each located at an axial distance from the equatorial plane which is equal to 0.3 times the maximum axial width L of the contact area of the tire. This maximum axial width L is measured on the tire mounted on its service rim, inflated to its service pressure, bearing its rated load and resting without lateral inclination on flat horizontal ground. The relative camber of convexity in the crown is the ratio $f_s/L$, $f_s$ being the radial distance between the equatorial point S and the points of intersection D, D' of the circular arc C with the lines F, F' parallel to the trace ZZ' of the equatorial plane which are located at the ends of the maximum axial width L of the contact area of the tire and L being the maximum axial width of the contact area of the tire.

The relative camber of convexity in the sidewalls is the ratio $f_f/(R_s-R_j)$, $f_f$ being equal to $(B-L)/2$, B being the maximum axial width of the carcass reinforcement 2 (such as, for instance, 0.975 times the maximum axial width $B_1$ of the tire which is stipulated in the standards), L being the maximum axial width of the contact area of the tire, $R_s$ being the equatorial radius of the carcass reinforcement 2 and $R_j$ being the radius at the bead seat on the rim J (radius stipulated in the standards) of the tire mounted on its service rim, inflated to its service pressure, but not under load.

In order to achieve the above-indicated twofold purpose, the invention provides a tire having a carcass reinforcement formed of at least one ply of radial cables which is anchored to at least one bead ring in each bead and a tripartite crown reinforcement composed of a median portion and of two lateral portions, each of the edges of the median portion being in contact with a lateral portion, each of these three portions being formed of at least one ply of textile cables forming an angle of between 0° and 30° with the circumferential direction of the tire, the relative camber of convexity of the carcass reinforcement in the crown being at most 0.12, preferably between 0.04 and 0.10, and the relative camber of convexity of the carcass reinforcement in the sidewalls being at most 0.14 when the tire is mounted on its service rim and inflated to its service pressure but not under load, the tire thus having a quasi-rectangular meridian profile, this tire being characterized by the fact that when it is mounted on its service rim but not inflated, its carcass reinforcement has, on the one hand, a relative camber of convexity in the crown of at most 0.20, preferably between 0.08 and 0.15, and a relative camber of convexity in the sidewalls of at most 0.25, and, on the other hand, a length such that after inflation of the tire to its service pressure its equilibrium curve at the level of the shoulders is located radially outwards of its curve in the uninflated tire, and by the fact that the median portion of the crown reinforcement is formed of cables whose extensibility is low, preferably close to zero, while the lateral portions of the crown reinforcement are formed of cables of very great extensibility.

Due, on the one hand, to the differences in extensibility between the medium portion and the lateral portions of the crown reinforcement in accordance with the invention, and, on the other hand, to the appropriate length of the carcass reinforcement, the latter tends, under the effect of the service pressure, to assume a meridian profile the curvature of which is high and maximum at the level of the shoulders of the tire, while the relative camber of convexity of the carcass reinforcement in the sidewalls and the relative camber of convexity of the carcass reinforcement in the crown decrease to assume values of less than 0.14 and 0.12, respectively.

The obtaining of a quasi-rectangular profile of the reinforcement of the tire of the invention under the effect of the service pressure results in a substantial radial expansion of the tire at the level of the shoulders. This expansion creates, within the cables of the lateral portions of the crown reinforcement, a very substantial additional tension as compared with the practically zero or even negative tensions present in the edges of the known crown reinforcements. This additional tension cooperates with the intentionally high extensibility of the lateral regions of the crown reinforcement to delay or prevent the occurrence of stationary waves at high speeds. If in a tire of the type claimed the circumferential tension of the crown reinforcement per unit of (axial) width is equal to about P.R (P=service inflation pressure; R=equatorial radius) at the level of the equator, the tension in the edges of the crown reinforcement according to the invention is more than 0.15 times, preferably 0.20 times, and may reach 0.6 times this equatorial tension.

Contrary to the centrifugal radial expansion acting solely on the mass of the crown, stationary waves are a vibratory phenomenon which is not only superimposed on the radial expansion but is related to the flattening of the crown in the contact area and is produced above a frequency, that is to say a speed, of rotation by the movement of the masses present. The movement of these masses delays the return of the flattened tire to its unflattened shape prior to the passage of the portion of the tire under consideration into the contact area. Numerous means (for instance, U.S. Pat. No. 2,958,359, French Pat. No. 2,121,736) have been devised in order circumferentially to stiffen the edges of the crown reinforcement and/or prevent the centrifugal radial expansion of the crown of highway tires. None of these means avoids the sudden reduction of the circumferential tension or even the appearance of a negative circumferential tension, that is to say of a compression, in the edges of the crown reinforcement. The momentary presence of a zero tension or of a compression combined with the intentional stiffness of the edges of the crown reinforcement makes the latter, and therefore the crown, incapable of at once recovering their previously unflattened shape, that is to say of opposing the development of stationary waves which persist and the number of which increases with the speed and tend to break up the crown of the tires of the type in question.

For the manufacture of the tire of the invention, recourse is had to a method which is characterized by the use of a vulcanization mold in which the carcass reinforcement of the tire has, on the one hand, a relative camber of convexity in the crown of at most 0.20, preferably between 0.08 and 0.15, and a relative camber of convexity in the sidewalls of at most 0.25, and, on the other hand, a length such that after inflation of the tire to its service pressure, its equilibrium curve at the level of the shoulders is located radially outwards of its curve in the mold, and characterized by the use of a crown reinforcement whose median portion is formed of cables of low extensibility, preferably close to zero, while the lateral portions of the crown reinforcement are formed of cables of very great extensibility.

Stated differently, this tire is vulcanized in a mold such that, seen in meridian section:

the maximum axial width of the carcass reinforcement of the tire in the mold is located at a radial distance from the axis of rotation of the tire which is less than the maximum axial width of the carcass reinforcement of the tire mounted and inflated to its service pressure but not under load, and the maximum axial width of the carcass reinforcement in the mold is greater than the maximum axial width of the carcass reinforcement in the mounted tire, inflated to its service pressure but not under load;

the intersection of the carcass reinforcement with the equatorial plane is approximately at the same radial distance from the axis of rotation of the tire in the mold as said intersection when the tire is mounted and inflated to its service pressure but not under load; and the curvature of the carcass reinforcement reaches a minimum value or a negative value which, however, is small in absolute value, approximately at the level of the outer edge of the corresponding lateral portion of the crown reinforcement, whereupon it increases and then decreases in the direction towards the intersection of the crown reinforcement with the equatorial plane.

The combination of this vulcanization in a mold whose meridian section is in accordance with the invention with the crown reinforcement having extensible lateral portions is capable of preferred variants described below and leads to preferred variants of the method of manufacture in accordance with the invention.

When the tire is removed from the mold and mounted on its service rim but not inflated, its outer surface as well as the carcass reinforcement, seen in meridian section, practically follow the profiles which they occupied in the mold.

When a tire according to the invention is inflated to its service pressure, the radius of the median portion of the crown with respect to the axis of rotation varies preferably relatively little, at least in its equatorial zone. For this purpose, the median portion of the crown reinforcement is formed of at least one ply of cables whose relative elongation is less than 3%, preferably between 0.1% and 1.5%, measured at 25% of the rupture force. This median portion is preferably also formed of cables orientated at about 0° with respect to the circumferential direction of the tire. It is also preferable for the axial width of this median portion to be less than 80% of the width of the crown reinforcement or 70% of the maximum width of the area of contact when the tire, inflated to its service pressure and bearing its service load, rests on a flat horizontal ground without lateral inclination. In case of the use of serveral crossed plies, the angles of these plies are preferably symmetrical and less than 30° with respect to the circumferential direction of the tire.

When inflated to its service pressure, the meridian profile of the carcass reinforcement reaches its maximum curvature at the level of the shoulders and its minimum curvature at the level of the equator of the tire. This is due to the relatively high extensibility of each lateral portion of the crown reinforcement according to the invention. The lateral portions are preferably formed of at least one ply of cables whose relative elongation is between 10% and 30% at the rupture force. Due to the extensibility of the cables which produces substantial displacement of the shoulders towards the outside under the service pressure and, contrary to the known arrangements, the purpose of which is to stiffen the edges of the crown reinforcement, it is possible to extend into the sidewalls at least one ply of each of the lateral portions of the crown reinforcement without interfering with the flattening of the shoulders upon travel. Preferably the width of the zone of each lateral portion which is common (common zone 0 in FIGS. 2 and 3) to the median portion of the crown reinforcement is at most equal to 15% of the width of the crown reinforcement. It is also preferable for the axial width of each lateral portion to be between 10% and 35% of the width of the crown reinforcement or between 8% and 32% of the maximum width of the area of contact as defined above. Preferably at least one lateral ply is arranged, in the zones in common with the median portion of the crown reinforcement, radially outwards of at least one median ply of the crown reinforcement.

Preferably the lateral portions of the crown reinforcement are formed of cables oriented at about 0° with respect to the circumferential direction of the tire. As a variant, when several crossed plies are provided, the angles of these plies are preferably symmetrical and less than 25° with respect to the circumferential direction of the tire.

If one defines as convexity of the tread the relative difference, expressed in percent of the equatorial radius $R_{max}$ (See FIG. 1) with reference to the axis of rotation XX' of the tire inflated to its service pressure but not under load, between the equatorial radius and the arithmetic average of the radii $R_{ep}$ measured at the points of the tire tread surface where the area of contact reaches its maximum axial width L (as defined above), the invention makes it possible to manufacture tires having a tread (surface) convexity of between 0% and 6% and which have a satisfactory resistance to wear. When a tire according to the invention is mounted on its service rim but not inflated, this convexity is greater by at least 1.5%, preferably 3% to 4%, of the equatorial radius of the tire inflated to its service pressure than said convexity measured on the tire when inflated to its service pressure.

In practice, the radial carcass reinforcement of a tire according to the invention is considered nonextensible when its relative elongation under the effect of the service pressure is between 1% and 2% of its length in the tire snugly fitting its vulcanization mold or mounted on its rim and subjected to an inflation pressure of practically zero. Then the maximum axial width of the carcass reinforcement in the mold is greater than its maximum axial width in the tire when the tire is mounted and inflated to its service pressure. However, the median portion of the crown reinforcement of the invention makes it possible to maintain the outer diameter of the tire at the service pressure at the value stipulated in the standards and furthermore, in the case of a tire for airplanes, to maintain its resistance at the test pressure.

The invention also makes it possible to use a radial carcass reinforcement whose relative extensibility, with respect to its length in the mold, or in the tire on its service rim and at an inflation pressure of practically zero, it at most equal to 5%. In this case, the maximum axial width of the carcass reinforcement in the mold may be less than its maximum axial width at the service pressure, while the other characteristics of the carcass reinforcement remain unchanged.

In the event that, for certain uses, it is advisable to add to the crown reinforcement of the invention one or more customary crown plies, for example, protective plies of elastic cables, these plies are arranged radially outwards of the crown reinforcement of the invention. These customary crown plies preferably have a width approximately equal to the width of the median portion of the crown reinforcement of the invention. When these customary crown plies consist of elastic steel cables, it is advisable to arrange the cables at angles at least equal to 45° with respect to the circumferential direction of the tire.

Under certain conditions of travel, in particular at high speed, the crown reinforcement of the invention may be damaged by objects (stones, metal parts lost by vehicles, etc.) laying in the path of the tire.

Due to the large amount of the expansion of the crown of the tire under the effect of the inflation it is not always possible to use a screen of ordinary elastic cables. The extensibility of these cables is not sufficient. The expansion of the crown of the invention is of such amount that these cables would lose their fundamental properties. They could no longer serve as protectors and would contribute to undesirably reinforcing the crown reinforcement.

It thus falls within the scope of the invention to have at least one ply of cables undulated in the plane of the ply cooperating with the crown reinforcement of the invention. This ply is arranged radially outwards of the crown reinforcement. Its properties do not prevent the unusual expansion of the crown nor reinforce it in undesirable manner.

For this purpose, the distance from one cable to the next is between 50% and 100% of the crest-to-crest amplitude of the undulations, and the wavelength of the undulations is between 100% and 200% of the crest-to-crest amplitude. The cables are parallel in the ply, that is to say the undulations are in phase; the mean axes of the undulations of the cables are oriented preferably at 0° or 90° with respect to the circumferential direction of the tire. This preference does not exclude the use of at least one ply of undulated cables whose mean axes extend obliquely with respect to the circumferential direction of the tire.

This ply may also be formed of a mesh of cables obtained, for instance, by simply crossing the undulations. In this case, the distance of one cable from the next is at most equal to the crest-to-creat amplitude of the undulations of the wires. The elasticity of the fabric increases when the distance between the cables decreases.

The portion of the description which follows refers to the drawing and is devoted to one embodiment of the invention. In this drawing (not drawn to scale):

Figure 1:
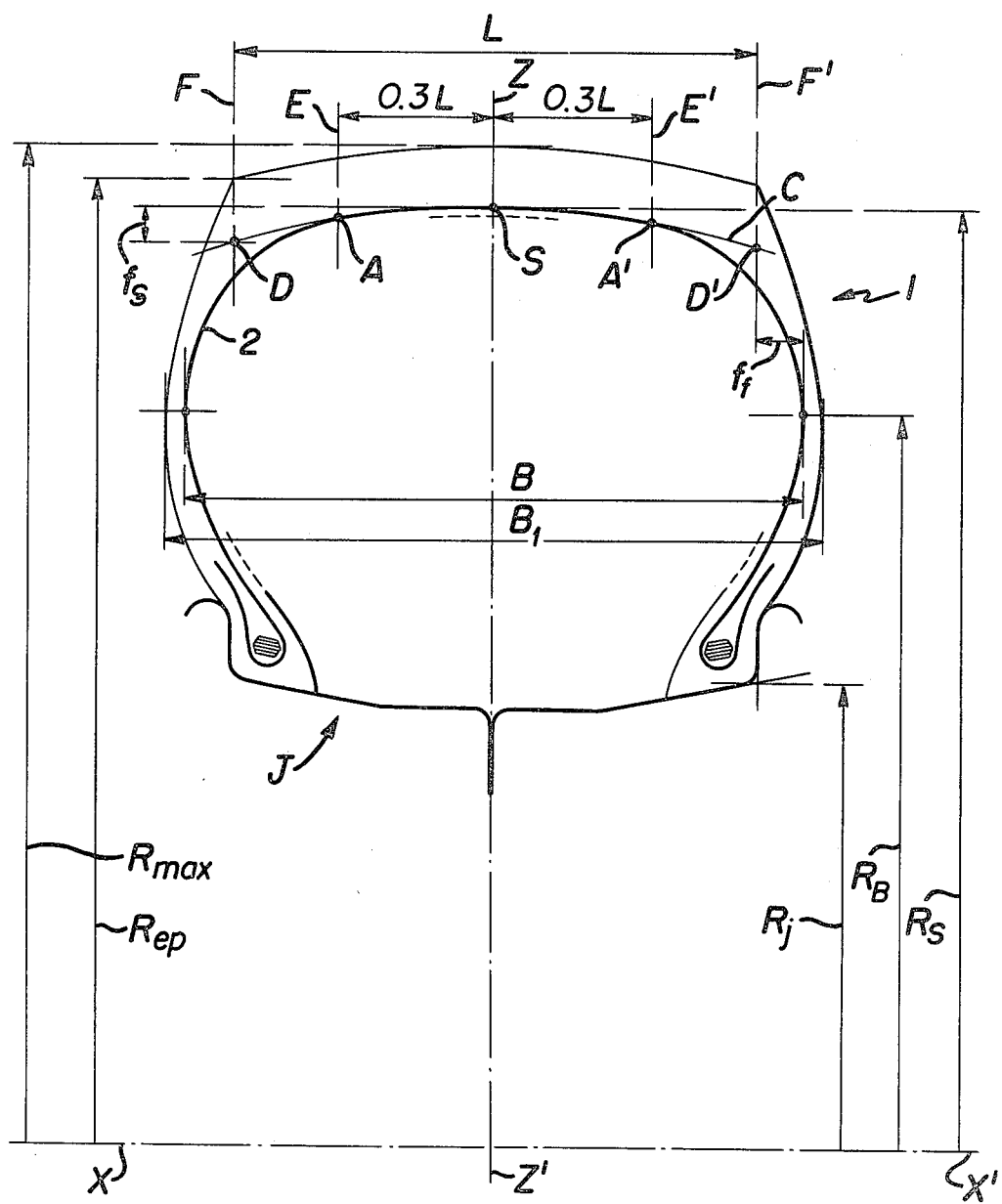
FIG. 1 is a schematic view in radial section of a tire of which only the carcass reinforcement is shown, the main purpose of this figure being to illustrate the definitions of the relative cambers of convexity of the carcass reinforcement in the crown, on the one hand, and in the sidewalls, on the other hand, and of the convexity of the tread.
Figure 3:
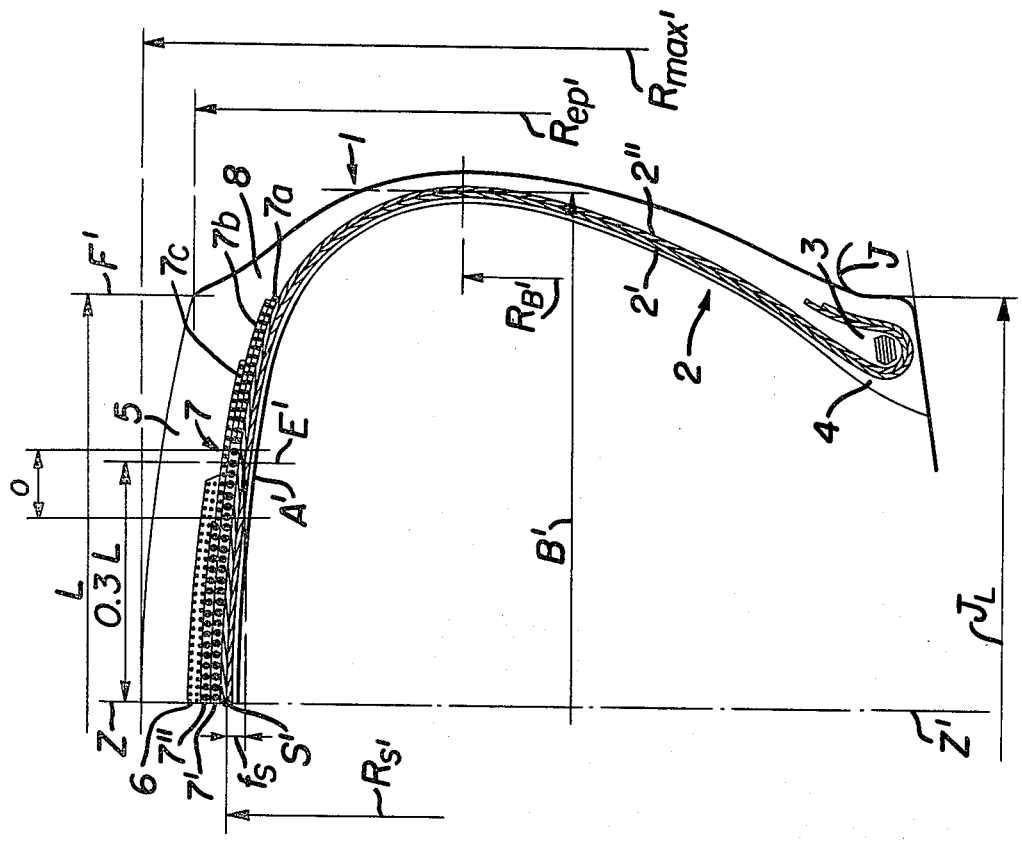
FIG. 3 is a view similar to FIG. 2 showing the tire removed from the mold and mounted on its service rim and inflated.
Figure 2:
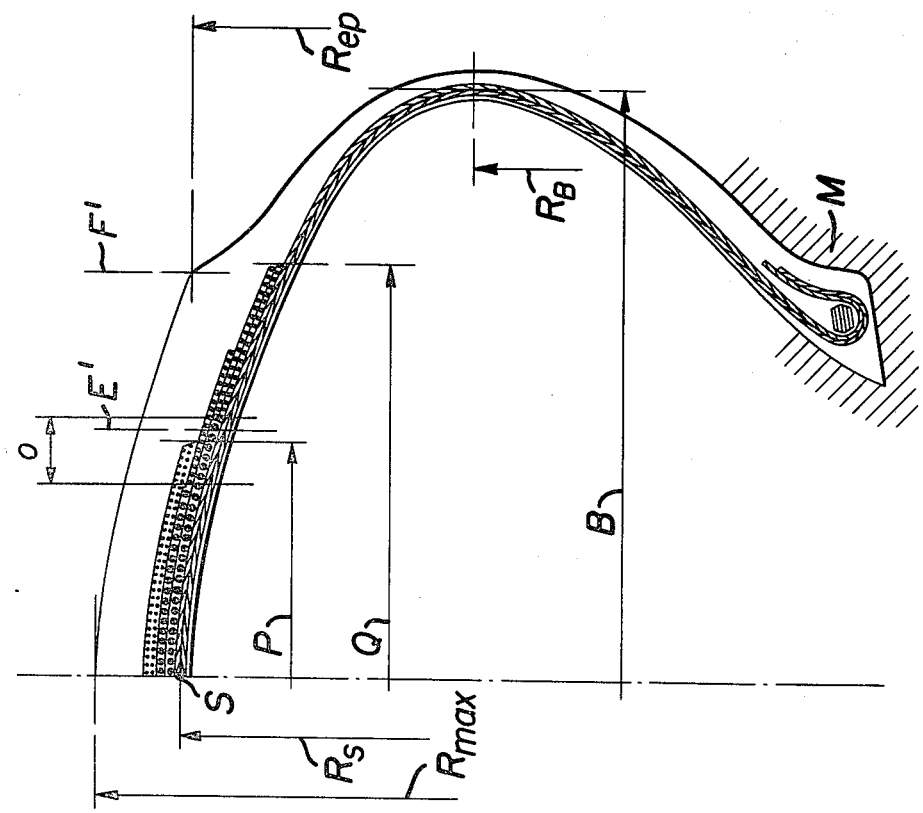
FIG. 2 is a radial half-section through a tire according to the invention in its vulcanization mold.

The tire 10 shown in FIGS. 2 and 3 is an airplane tire of size 750×230-15 (French Standard); it has a carcass reinforcement 2 formed in this case of two superposed plies 2', 2" of radial cables of aromatic polyamide of 167×3 tex. The ends of these two plies are each turned around a metal bead ring 3 present in each of the beads 4 of the tire.

Within the tread 5 of the tire there are arranged protective plies schematically indicated at 6 and, below them, applied on the carcass reinforcement 2, a crown reinforcement 7, the edges of which, furthest from the trace of the longitudinal median plane ZZ', are located in the region of the shoulders 8 of the tire.

The contact area, measured under a load of 5850 daN and an inflation pressure of 15 bars on a flat horizontal ground, has a width L equal to 185 mm. The protective plies 6 have a width P of 115 mm; the crown reinforcement 7 has a total width Q equal to 194 mm. This crown reinforcement is composed of two median plies 7', 7" and, on each side of them is axial direction, three lateral plies 7a, 7b, 7c. The median ply 7' has an axial width of 120 mm, the median ply 7" has an axial width of 90 mm. These two plies 7', 7", arranged symmetrically with respect to the trace ZZ' of the longitudinal median plane of the tire, are each composed of adjoining cables of aromatic polamide of 330×3×3 tex, each having a diameter of 2.3 mm and a resistance to rupture of 420 daN under a relative elongation of 6.1%. These cables are arranged parallel to the equatorial plane of the tire, of trace ZZ'.

The three lateral plies 7a, 7b, 7c are juxtaposed in axial direction to the two median planes 7', 7". Their widths are equal to 38 mm, 37 mm and 35 mm, respectively. The lateral plies 7a and 7b are juxtaposed to the median ply 7'; the lateral ply 7c is juxtaposed to the median ply 7" and covers or overlaps the edge of the median ply 7' in the overlapping or common zone 0 over a width of 15 mm.

Each of these three lateral plies 7a, 7b, 7c is composed of adjoining cables of rayon of 244×2 tex, each having a diameter of 0.8 mm and a resistance to rupture of 20 daN under a relative elongation of 14%. These cables are arranged parallel to the equatorial plane of the tire, of trace ZZ'.

The dimensions B, $R_B$, $R_S$, $R_{max}$ and $R_{ep}$ of the tire in the mold M (FIG. 2) and the corresponding dimensions B', $R_{B'}$, $R_{S'}$, $R_{max'}$ and $R_{ep'}$ of the same tire but removed from the mold M and mounted on its service rim J of width $J_L=178$ mm and inflated to different pressures (FIG. 3), are indicated in the following table (in mm) under the following conditions:

(a) in the mold,
(b) on the rim, at service pressure (15 bars)
(c) on the rim, at test pressure (60 bars)

| B | B' | $R_B$ | $R_{B'}$ | $R_S$ | $R_{S'}$ | $R_{max}$ | $R_{max'}$ | $R_{ep}$ | $R_{ep'}$ |
|---|---|---|---|---|---|---|---|---|---|
| (a) 251 | 278 | | | 359 | | 374 | | 352 | |
| (b) | 229 | | 285 | | 362 | | 377 | | 365 |
| (c) | 235 | | | | | | | | |

Figure 4:
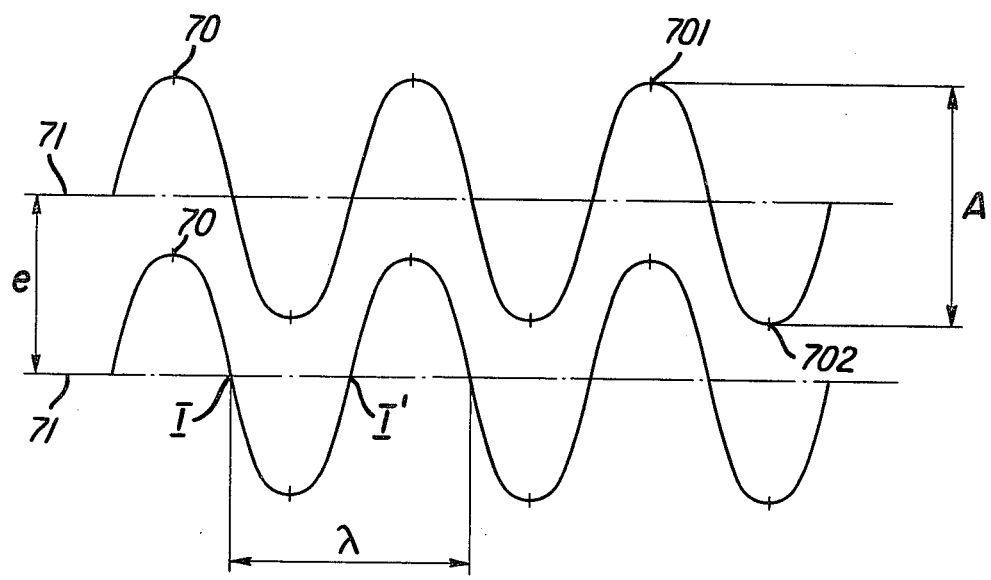
FIG. 4 shows schematically a portion of a protective ply of such a tire.

A very extensible protective screen has been made in accordance with the scheme of FIG. 4 for an airplane tire of size 46×16-20. For this purpose, there was used a ply of undulated cables 70 of 1 mm in diameter formed of 9 steel wires of 23/100 mm in diameter. The undulations are sinusoidal, with an amplitude A from crest 701 to crest 702 of 5 mm and a wavelength λ of 5 mm. The distance apart e of the parallel cables 70, that is to say the cables in phase, is 3.5 mm. The mean axes 71 of the modulations are oriented 90° with respect to the circumferential direction of the tire (not shown).

FIG. 4 is a partial representation of two adjacent cables 70 of this screen-ply. The spacing e of the cables is equal to the distance between the mean axes 71 of two undulations. The wavelength λ is twice the distance between two consecutive points of intersection I and I' of a sinusoid with the mean axis 71. The amplitude A is the distance from one crest 701 to the following crest 702 of a sinusoid. By undulation there is understood, for the purpose of this invention, any sinusoidal or sawtooth contour with or without clipped crests.

As can be seen, the amplitudes, wavelengths and spacings of the cables have values which are unusual as compared with known undulated cable plies.

The undulated cables can also be replaced by coil springs of, for instance, elliptical or rectangular section, the major axis or large side of which is parallel to the plane of the ply used. These springs are preferably made of steel wire. At least one ply of approximately parallel metallic fibers (diameters from 0.1 to 1 mm; lenghs of 5 to 20 mm) dispersed in a layer of rubber can also be used as protective screen.

What is claimed is:

1. A tire for airplanes having a carcass reinforcement formed of at least one ply of radial cables which is anchored to at least one bead ring in each bead and a tripartite crown reinforcement composed of a median portion and two lateral portions, each of the edges of the median portion being in contact with a lateral portion, each of these three portions being formed of at least one ply of textile cables forming an angle of between 0° and 30° with the circumferential direction of the tire, the relative camber of convexity of the carcass reinforcement in the crown being at most 0.12, preferably between 0.04 and 0.10, and the relative camber of convexity of the carcass reinforcement in the sidewalls being at most 0.14 when the tire is mounted on its service rim and inflated to its service pressure but not under load, the tire thus having a quasi-rectangular meridian profile, this tire being characterized by the fact that when it is mounted on its service rim but not inflated, its carcass reinforcement has a relative camber of convexity in the crown of at most 0.20, preferably between 0.08 and 0.15, and a relative camber of convexity in the sidewalls of at most 0.25 and a length such that after inflation of the tire to its service pressure its equilibrium curve at the level of the shoulders is located radially outwards of its curve in the uninflated tire, and by the fact that the median portion of the crown reinforcement is formed of cables whose extensibility is low, preferably close to zero, while the lateral portions of the crown reinforcement are formed of cables of very great extensibility.

2. A tire according to claim 1, characterized by the fact that when the tire is mounted on its service rim but not inflated, the convexity of the tread is greater by at least 1.5%, preferably 3% to 4%, of the equatorial radius ofthe tire inflated to its service pressure than said convexity measured on the tire when inflated to its service pressure, said convexity measured on the tire inflated to its service pressure being between 0% and 6% of the equatorial radius of the tire.

3. A tire according to claim 1 or 2, characterized by the fact that the median portion of the crown reinforcement is formed of at least one ply of cables whose relative elongation is less than 3%, preferably between 0.1% and 1.5%, measured at 25% of the rupture force.

4. A tire according to claim 1 or 2, characterized by the fact that the median portion of the crown reinforcement is formed of cables oriented at about 0° with respect to the circumferential direction of the tire.

5. A tire according to claim 1 or 2, characterized by the fact that the median portion of the crown reinforcement has an axial width less than 80% of the width of the crown reinforcement.

6. A tire according to claim 1 or 2, characterized by the fact that the median portion of the crown reinforcement is formed of plies of cables which are crossed symmetrically at angles of less than 30° with respect to the circumferential direction of the tire.

7. A tire according to claim 1 or 2, characterized by the fact that in the lateral portions of the crown reinforcement the cables have a relative elongation of between 10% and 30% at the rupture force.

8. A tire according to claim 1 or 2, characterized by the fact that in the lateral portions of the crown reinforcement the cables are oriented at about 0° with respect to the circumferential direction of the tire.

9. A tire according to claim 1 or 2, characterized by the fact that each lateral portion of the crown reinforcement has an axial width of between 10% and 35% of the width of the crown reinforcement.

10. A tire according to claim 1 or 2, characterized by the fact that the lateral portions of the crown reinforcement are formed of plies of cables which are crossed symmetrically at angles of less than 25° with respect to the circumferential direction of the tire.

11. A tire according to claim 1 or 2, characterized by the fact that the crown reinforcement has at least one lateral ply arranged radially outwards of at least one median ply in the zone of contact between the lateral and median portions so as to create a zone common to the median portion and each of the lateral portions.

12. A tire according to claim 11, characterized by the fact that the common zone between each lateral portion and the median portion of the crown reinforcement has an axial width at most equal to 15% of the width of the crown reinforcement.

13. A tire according to claim 1 or 2, characterized by the fact that the radial carcass reinforcement has a relative elongation under the effect of the service pressure of between 1% and 2% of its length in the mold.

14. A tire according to claim 1, characterized by the fact that it further comprises customary crown plies which are arranged radially outwards of the crown reinforcement.

15. A tire according to claim 14, characterized by the fact that the customary crown plies have a width approximately equal to the width of the median portion of the crown reinforcement.

16. A tire according to claim 14 or 15, characterized by the fact that the customary crown plies are of elastic steel cables arranged at angles at least equal to 45° with respect to the circumferential direction of the tire.

17. A tire according to claim 1, characterized by the fact that radially outwards of the crown reinforcement there is arranged at least one ply of parallel cables undulated in the plane of the ply, the distance between the cables being between 50% and 100% of the crest-to-crest amplitude of the undulations, the wavelength thereof being between 100% and 200% of the amplitude, and the mean axes of the undulations of these cables being oriented preferably at 0° or 90° with respect to the circumferential direction of the tire.

18. A method for manufacturing a tire for airplanes having a carcass reinforcement formed of at least one ply of radial cables which is anchored to at least one bead ring in each bead and a tripartite crown reinforcement composed of a median portion and two lateral portions, each of the edges of the median portion being in contact with a lateral portion, each of these three portions being formed of at least one ply of textile cables forming an angle of between 0° and 30° with the circumferential direction of the tire, characterized by the use of a vulcanization mold in which the carcass reinforcement of the tire has a relative camber of convexity in the crown of at most 0.20, preferably between 0.08 and 0.15, and a relative camber of convexity in the sidewalls of at most 0.25, and a length such that after inflation of the tire to its service pressure, its equilibrium curve at the level of the shoulders is located radially outwards of its curve in the vulcanization mold;

and characterized by the use of a crown reinforcement whose median portion is formed of cables of low extensibility, preferably close to zero, while the lateral portions of the crown reinforcement are formed of cables of very great extensibility;

when the tire is mounted on its service rim and inflated to its service pressure but not under load, its carcass reinforcement has a relative camber of convexity in the crown of at most 0.12, preferably between 0.04 and 0.10, and a relative camber of convexity in the sidewalls of at most 0.14, the tire thus having a quasi-rectangular meridian profile.

* * * * *